United States Patent Office

3,042,883
Patented July 3, 1962

3,042,883
FREQUENCY WAVE-FILTER
Anton Eduard Pannenborg and Arnold Edmond Marie Calon, Eindhoven, Netherlands, assignors, by mesne assignments, to North American Philips Company, Inc., New York, N.Y., a corporation of Delaware
Filed July 12, 1954, Ser. No. 442,738
Claims priority, application Netherlands July 24, 1953
6 Claims. (Cl. 333—10)

This invention relates to frequency wave-filters comprising a wave guide of which one outlet is loaded free from reflection.

In the wave filter according to the invention the wave guide is coupled by means of a directional coupling to a wave-guide system in which a rotating wave can occur, in such manner that a wave travelling in the wave guide towards the outlet splits at the directional coupling into a wave travelling through the wave guide and a wave moving in the rotational direction in the wave-guide system, and the wave rotating in the wave-guide system splits at the directional coupling into a wave moving around in the wave-guide system and a wave travelling in the wave guide towards the outlet. The wave-guide system furthermore comprises means for attenuating the rotating wave in such manner that the waves travelling through the wave guide eliminate one another for at least one frequency.

The wave-guide system may be constituted, for example, by a wave guide closed on itself or a single coherent hollow cavity member.

In one preferred embodiment of the wave filter, the wave-guide system is coupled by way of a second directional coupling to a further wave guide in such manner that a wave moving around in the wave-guide system splits at this directional coupling into a wave travelling in the initial direction and a wave travelling in the further wave guide, which further wave guide is closed free from reflection with respect to this wave. The wave filter may in this case be used as a directional filter.

The filter according to the invention has the special advantage that its input impedance is constant.

In order that the invention may be readily carried into effect, it will now be described with reference to the accompanying drawing showing diagrammatically, by way of example, two embodiments thereof.

Figure 1:
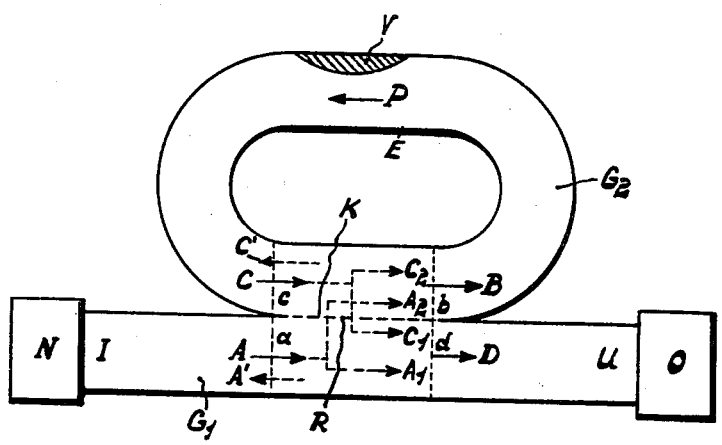
FIG. 1 shows the construction of a preferred embodiment of the invention.

In the filter shown in FIG. 1, the inlet I of a wave guide $G_1$ is coupled to a generator N and the outlet U is coupled to a receiver O, which closes the wave guide $G_1$ free from reflection. The wave guide $G_1$ is coupled by way of a directional coupling R to a second wave guide $G_2$ which is closed on itself. The directional coupling R is constituted by a plurality of apertures K provided in the common side-wall between the two wave guides. A wave A generated by the generator N splits in the directional coupling into a wave $A_1$ in the guide $G_1$ and a wave $A_2$ in the wave guide $G_2$. Consequently, a wave A' does not occur in the wave guide $G_1$ in the backward direction, neither does a wave C' occur in the wave guide $G_2$. On a other hand, the wave C in the wave guide $G_2$ splits in the directional coupling R into a wave $C_2$ in the wave guide $G_2$ and a wave $C_1$ in the wave guide $G_1$. The superposition of the waves $C_2$ and $A_2$ provides at $b$ in the wave guide $G_2$ a resulting wave B. Similarly, the waves $A_1$ and $C_1$ in the wave guide $G_1$ together result in a wave D. The wave B moves around in the wave guide $G_2$ in the direction of arrow P, which wave after having been attenuated in an attenuator V becomes the wave C. The attenuator V is of a design such that reflection does not occur. The waves $A_1$ and $C_1$ in the wave guide $G_1$ are exactly in phase opposition for determined frequencies according to the length of wave guide $G_2$. The attenuator V is adjusted in such manner that the amplitudes of the waves $A_1$ and $C_1$ are equal for at least one of the said frequencies, so that these waves eliminate one another and wave energy does not reach the receiver O.

A calculation shows that, if the wall losses are negligible, the attenuator must be so adjusted that $$\frac{C}{B} = \frac{A_1}{A} = \frac{C_1}{C}$$

where A, B, C, $A_1$ and $C_1$ represent the amplitudes of waves of the same polarity. The waves $A_1$ and $C_1$ do not eliminate one another at other frequencies, so that the generator N transfers a certain wave energy to the receiver O. The frequency range in which the transmission of energy is suppressed by the filter is smaller and hence the operation of the filter more selective accordingly as the degree of coupling between the wave guides $G_1$ and $G_2$ is smaller. Since at all frequencies the waves A and C each split solely into two waves travelling to the right and the wave guide $G_1$ is closed free from reflection by the receiver O, wave energy does not return to the generator N, so that the load on the generator is constant.

In the embodiment shown in FIG. 1, the directional coupling R is constituted by a plurality of apertures K. As is well-known, such a directional coupling may alternatively be constituted by a single aperture of suitable shape, for example by a narrow longitudinal slot. The wave guide $G_2$, which is closed on itself, has the shape of a ring. If desired, the open central portion of this ring may be reduced in size until it becomes omitted, so that a single coherent hollow space in the form of a box results, in which the wave B performs a rotational movement.

Figure 2:
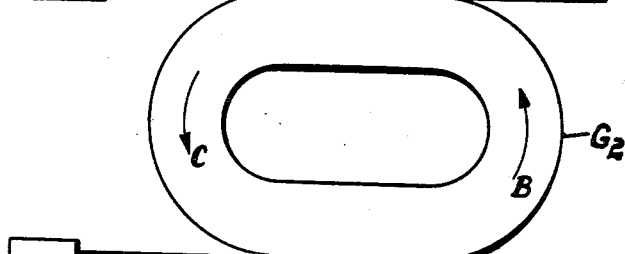
FIG. 2 shows another embodiment of the invention.

With the directional filter shown in FIG. 2, the wave guide $G_2$ is coupled by way of a second directional coupling $R_2$ to a further wave guide $G_3$. The waves in this filter travel in the direction of the arrows. The rotating wave B instead of being attenuated by the attenuator V, as in FIG. 1, is attenuated in this filter by that part of the energy at the directional coupling $R_2$ which passes to the wave guide $G_3$. With the filter shown in FIG. 1, the energy provided by the generator N is distributed over the attenuator V and the receiver O. The energy absorbed by the attenuator V is thus complementary to the energy supplied to the receiver O. Similarly, with the filter shown in FIG. 2, the energies supplied to the receivers $O_1$ and $O_2$ are complementary to one another. Consequently, if the coupling factor of the directional coupling $R_1$ is comparatively small, the transmission of energy to the receiver $O_1$ is suppressed only in a small frequency interval and, conversely, transmission of energy to the receiver $O_2$ will thus take place only in this frequency interval.

A calculation shows that the coupling factors of the two directional couplings $R_1$ and $R_2$ must be equal, if the wall losses in the wave guide $G_2$ are negligible.

What is claimed is:

1. A frequency wave-filter comprising a first waveguide having an input end and an output end, a waveguide system comprising a second waveguide having a loop-shaped path substantially closed upon itself for electrical waves, said first and second waveguides having a common wall portion, aperture means extending through said common wall portion whereby a directional coupling is provided between said first and second waveguides, a source of electric waves coupled to said input end, load means coupled to said output end, and means for partially attenuating the electric waves in said waveguide system whereby electric waves in said output end are canceled for at least one frequency.

2. A frequency wave-filter comprising a first waveguide having an input end and an output end, a source of electric waves connected to said input end, a load connected to said output end, a waveguide system comprising a second waveguide having a loop-shaped path substantially closed upon itself for electric waves, said first and second waveguides having a common wall portion, means for directionally coupling electric waves through said common wall portion whereby electric waves in said first waveguide propagating toward said load which are coupled into said second waveguide circulate in said loop-shaped path in substantially only one direction, and electric waves circulating in said loop-shaped path in said one direction which are coupled to said first waveguide propagate substantially only toward said load, and means for partially attenuating the electric waves in said waveguide system whereby electric waves in said output end are canceled for at least one frequency.

3. A frequency wave-filter comprising a first waveguide having an input end and an output end, a second waveguide closed upon itself to provide a circulating path for electrical waves, said first and second waveguides having a common wall portion, aperture means extending through said common wall portion whereby a directional coupling is provided between said first and second waveguides, a source of electric waves coupled to said input end, load means coupled to said output end, and attenuator means positioned within said second waveguide whereby electric waves in said output end are canceled for at least one frequency.

4. A frequency wave-filter comprising a first waveguide having an input end and a first output end, a source of electric waves connected to said input end, a load connected to said first output end, a second waveguide having a loop-shaped path substantially closed upon itself for electric waves, a third waveguide having a second output end, said first and second waveguides having a first common wall portion, said second and third waveguides having a second common wall portion, and aperture means in said first and second common wall portions for directionally coupling electric waves between said first and second waveguides and between said second and third waveguides, respectively, whereby electric waves from said source are canceled in said first output end and propagated to said second output end for at least one frequency.

5. The wave-filter of claim 4 in which the coupling factors of waves coupled between said first and second waveguides and between said second and third waveguides are substantially equal.

6. A frequency wave-filter comprising a first directional coupler having first and second input terminals and first and second output terminals, a second directional coupler having third and fourth input terminals and third and fourth output terminals, a source of electric waves connected to said first input terminal, first load means connected to said first output terminal, first transmission line means connecting said second output terminal to said third input terminal, second transmission line means connecting said third output terminal to said second input terminal, and second load means connected to said fourth output terminal, whereby electric waves from said source are canceled in said first output terminal and propagated to said fourth terminal for at least one frequency.

References Cited in the file of this patent

UNITED STATES PATENTS

| | | |
|---|---|---|
| 2,479,650 | Tiley | Aug. 23, 1949 |
| 2,633,492 | Ring | Mar. 31, 1953 |
| 2,709,241 | Riblet | May 24, 1955 |
| 2,739,287 | Riblet | Mar. 20, 1956 |
| 2,757,366 | Zaleski | July 31, 1956 |
| 2,800,632 | Walker | July 23, 1957 |
| 2,849,689 | Kock | Aug. 26, 1958 |